US012583003B2

(12) United States Patent
Hayes-Pankhurst et al.

(10) Patent No.: US 12,583,003 B2
(45) Date of Patent: Mar. 24, 2026

(54) DEVICES FOR DISPENSING FLUIDS

(71) Applicant: PSG Germany GmbH, Duisburg (DE)

(72) Inventors: Richard Paul Hayes-Pankhurst, London (GB); Ken Roberts, Chumleigh (GB)

(73) Assignee: PSG Germany GmbH, Duisburg (DE)

( * ) Notice: Subject to any disclaimer, the term of this patent is extended or adjusted under 35 U.S.C. 154(b) by 190 days.

(21) Appl. No.: 18/289,731

(22) PCT Filed: May 5, 2022

(86) PCT No.: PCT/EP2022/062229
§ 371 (c)(1),
(2) Date: Nov. 6, 2023

(87) PCT Pub. No.: WO2022/234056
PCT Pub. Date: Nov. 10, 2022

(65) Prior Publication Data
US 2024/0286158 A1 Aug. 29, 2024

(30) Foreign Application Priority Data

May 5, 2021 (GB) ..................................... 2106401

(51) Int. Cl.
*B05B 9/08* (2006.01)
*A47L 15/44* (2006.01)
(Continued)

(52) U.S. Cl.
CPC ............ *B05B 9/0861* (2013.01); *B05B 9/085* (2013.01); *F04C 5/00* (2013.01); *A47L 15/4445* (2013.01);
(Continued)

(58) Field of Classification Search
CPC ......... B05B 9/0861; B05B 9/085; F04C 5/00; F04C 2240/81; F04C 2250/20; A47L 15/4445; G01D 5/3473; G01P 3/44
See application file for complete search history.

(56) References Cited

U.S. PATENT DOCUMENTS 4,235,377 A 11/1980 Davis et al.
5,305,923 A 4/1994 Kirschner et al.
(Continued)

FOREIGN PATENT DOCUMENTS

EP 1389488 3/2008
GB 851092 10/1960
(Continued)

OTHER PUBLICATIONS

International Search Report and Written Opinion in International Appln. No. PCT/EP2022/062229, mailed on Aug. 26, 2022, 16 pages.
(Continued)

*Primary Examiner* — Mary A Davis
(74) *Attorney, Agent, or Firm* — Fish & Richardson P.C.

(57) ABSTRACT

A reusable fluid dispenser (100) and a disposable fluid pack (200) for use with the reusable fluid dispenser (100) is provided for dispensing fluids. Multiple different disposable fluid packs (200) may be interchangeably used with the same reusable fluid dispenser (100) such that multiple different fluids may be dispensed at multiple different flow rates, without cross contamination of the fluids. The reusable fluid dispenser (100) comprises a housing (102), a motor (106), a controller (114), a power supply (104) and a decoder (110) and a lens array (116). The disposable fluid pack (200) comprises a fluid reservoir (202), a pump (204) and an encoder (206).

21 Claims, 11 Drawing Sheets

(51) Int. Cl.
   *F04C 5/00*        (2006.01)
   *G01D 5/347*       (2006.01)
   *G01P 3/44*        (2006.01)

(52) U.S. Cl.
   CPC ...... *F04C 2240/81* (2013.01); *F04C 2250/20* (2013.01); *G01D 5/3473* (2013.01); *G01P 3/44* (2013.01)

(56)                References Cited

U.S. PATENT DOCUMENTS

| | | | |
|---|---|---|---|
| 5,836,482 | A | 11/1998 | Ophardt et al. |
| 8,037,844 | B2 | 10/2011 | Mather et al. |
| 8,584,973 | B2 | 11/2013 | Mather et al. |
| 9,227,209 | B2 | 1/2016 | Mather et al. |
| 9,649,651 | B2 | 5/2017 | Mather et al. |
| 9,713,817 | B2 | 7/2017 | Mather et al. |
| 9,878,337 | B1 | 1/2018 | Hong |
| 11,624,362 | B2 * | 4/2023 | Dawn ..................... F04C 13/00 417/44.1 |
| 2004/0064088 | A1 | 4/2004 | Gorman et al. |
| 2009/0110803 | A1 | 4/2009 | Mather et al. |

| | | | |
|---|---|---|---|
| 2010/0072309 | A1 | 3/2010 | Hodge et al. |
| 2013/0270303 | A1 | 10/2013 | Centofante et al. |
| 2018/0200743 | A1 | 7/2018 | Dawson et al. |
| 2019/0255248 | A1 | 8/2019 | Michaud |
| 2023/0330995 | A1 * | 10/2023 | Harada ..................... F04C 5/00 |

FOREIGN PATENT DOCUMENTS

| | | |
|---|---|---|
| WO | WO 96/36556 | 11/1996 |
| WO | WO 2006027548 | 3/2006 |
| WO | WO 2013050491 | 4/2013 |
| WO | WO 2014135563 | 9/2014 |
| WO | WO 2021119513 | 6/2021 |

OTHER PUBLICATIONS

International Preliminary Report on Patentability in International Appln. No. PCT/EP2022/062229, mailed on Nov. 16, 2023, 12 pages.
Search Report in British Appln. No. GB2106401.9, dated Sep. 17, 2021, 1 page.

* cited by examiner

206

450B

204B

204A

450A

452

454

610

600

500

610

DEVICES FOR DISPENSING FLUIDS

The present techniques relate to devices for dispensing fluids. More particularly, the techniques relate to a reusable fluid dispenser and a disposable fluid pack for use with the reusable fluid dispenser for dispensing fluids.

BACKGROUND

Known spraying devices for spraying fluids such as paint, cleaning products, insecticides, oils, degreasing fluids etc., have a motor and a pump to convey the fluid from a reservoir and out of a fluid nozzle at a predetermined flow rate or pressure. After use, the spraying devices are required to be cleaned thoroughly in order that they may be used in the future with either the same type or a different type of fluid. However, it is often difficult to thoroughly clean the nozzle, fluid reservoir and interconnecting tubes of such devices. Other spraying devices use a pressurised reservoir where the gas pressure is introduced by a hand pump or the reservoir is pre-filled with a fluid under pressure which keeps the fluid in a liquid state at ambient temperature.

It is also known to provide different fluid packs for use with a motor, for example, in the commercial catering industry, where a concentrate, such as apple juice concentrate, cola flavouring etc., may be provided in a pack with an attached radio-frequency identification (RFID) tag. A RFID reader identifies the RFID tag within the pack and also communicates data such as the product type, its dilution ratio, i.e., the ratio at which the concentrate is to be mixed with water, and the flow rate for dispensing the fluid. The RFID reader is read by the motor controller of the motor of a fluid dispenser, which pumps the concentrate, mixed with water, at the appropriate flow rate. However, RFID tags and readers are expensive and therefore are not desirable for use in smaller spraying devices, such as for the domestic markets.

SUMMARY

According to a first embodiment, there is provided a disposable fluid pack for use with a reusable fluid dispenser. The disposable fluid pack comprises: a fluid reservoir configured to be filled with a fluid; a pump comprising an inlet in fluid communication with the fluid reservoir, an outlet and a rotor, the rotor configured to form a power transmission coupling with a motor drive shaft, the pump configured to pump the fluid in a first direction from the fluid reservoir and out of the outlet; and an encoder comprising encoded data, the encoded data defining at least one stop position of the rotor and a rotation speed of the rotor for pumping the fluid from the fluid reservoir, wherein the encoder is coupled to the rotor at a predefined position and is configured to rotate with the rotor.

According to another embodiment, the encoder data defines the rotation speed as a plurality of spaced markings.

According to another embodiment, the at least one stop position comprises two or more equally spaced stop positions.

According to another embodiment, the at least one stop position comprises two or more equally spaced stop positions, and the plurality of spaced markings are repeated between each of the two or more equally spaced stop positions.

According to another embodiment, each of the two or more equally spaced stop positions are aligned with a corresponding feature of the rotor.

According to another embodiment, the plurality of spaced markings defines an angular velocity and/or an acceleration profile and a deceleration profile.

According to another embodiment, the encoder data further defines pack information.

According to another embodiment, the encoder data further defines the direction of rotation.

According to another embodiment, the encoder is printed onto, or etched onto, or attached to the rotor.

According to another embodiment, the pump is further configured to pump the fluid in a second direction, opposite to the first direction.

According to another embodiment, the outlet is coupled to a nozzle.

According to another embodiment, the outlet is coupled to an infusion line.

According to another embodiment, the outlet is coupled to a medical device or medical equipment.

According to another embodiment, the pump comprises a diluant pump and the disposable fluid pack further comprises a diluant inlet coupled to the diluant pump, the diluant inlet configured to receive a diluant, wherein the diluant pump is configured to mix the diluant with the fluid from the fluid reservoir and pump the mix out of the outlet.

According to another embodiment, the disposable fluid pack is configured to be used in an item of enduring equipment.

According to another embodiment, the encoder comprises an encoder disc attached to the rotor.

According to another embodiment, the encoder comprises an encoder sleeve or an encoder drum attached to the rotor.

According to another embodiment, the pump comprises a 2-bolus rotary pump and further comprises a pump housing, wherein the rotor is disposed within the pump housing to form two chambers between the rotor and the pump housing.

According to another embodiment, the pump comprises a 3-bolus rotary pump and further comprises a pump housing, wherein the rotor is disposed within the pump housing to form three chambers between the rotor and the pump housing.

According to another embodiment, the pump comprises a 4-bolus rotary pump and further comprises a pump housing, wherein the rotor is disposed within the pump housing to form four chambers between the rotor and the pump housing.

According to another embodiment, the pump comprises a 5-bolus rotary pump and further comprises a pump housing, wherein the rotor is disposed within the pump housing to form five chambers between the rotor and the pump housing.

According to another embodiment, the nozzle comprises a plurality of exit holes.

According to another embodiment, the nozzle comprises a plurality of different sized exit holes.

According to another embodiment, the disposable fluid pack further comprises a removable hollow wand configured to be attached at a first end to the pump outlet, the wand comprising a nozzle at its second end through which the fluid exits.

According to another embodiment, the rotor forms the power transmission coupling with the motor drive shaft of a motor of a reusable fluid dispenser when the disposable fluid pack is connected to the reusable fluid dispenser, and wherein the motor drive shaft is configured to drive the rotor to pump the fluid from the fluid reservoir and out of the outlet.

According to another embodiment, the outlet comprises a foaming nozzle.

According to another embodiment, the fluid reservoir comprises a concentrated fluid.

According to another embodiment, the rotation speed is selected in dependence on the fluid within the fluid reservoir.

According to another embodiment, the disposable fluid pack further comprises a tube connecting the outlet of the pump to a nozzle.

According to another embodiment, the disposable fluid pack further comprises a tube connecting the inlet of the pump to the fluid reservoir.

According to a second embodiment, there is provided a reusable fluid dispenser for use with a disposable fluid pack for dispensing fluids. The reusable fluid dispenser comprises: a motor comprising a drive shaft, the drive shaft configured to form a power transmission coupling with a rotor of a pump of the disposable fluid pack; a decoder and a lens array configured to retrieve encoder data from an encoder of the disposable fluid pack; a controller configured to receive the encoder data from the decoder and to instruct the motor to rotate the drive shaft at a rotation speed and to stop the drive shaft at any one of one or more predetermined stop positions defined by the encoder data; a power supply coupled to the controller, the motor and the decoder; and a housing, the motor, the decoder, the lens array and the controller being disposed within the housing.

According to another embodiment, the decoder comprises a light emitter configured to emit light at the encoder and a light sensor configured to receive light reflected from the encoder.

According to another embodiment, the lens array is configured to focus the light emitted from the light emitter onto the encoder and to focus the light reflected from the encoder onto the light sensor.

According to another embodiment, the light sensor is configured to detects the light reflected from a plurality of spaced markings provided at the encoder when the encoder is rotating, the plurality of spaced markings defining the rotation speed of the drive shaft and the one or more predetermined stop positions of the drive shaft.

According to another embodiment, the decoder is configured to count the number of detected one or more predetermined stop positions per use and the controller is configured to determine an amount of fluid delivered by the reusable fluid dispenser per use based on the counted number of detected one or more predetermined stop positions.

According to another embodiment, the reusable fluid dispenser further comprises releasable attachment means for releasably attaching the pump of the disposable fluid pack to the reusable fluid dispenser and to counter torque created when the motor is activated.

According to another embodiment, the motor comprises a stepper motor or a direct current motor, the stepper or direct current motor comprising a shaft encoder and a decoder, the decoder configured to measure the speed of rotation of the motor shaft during use, and wherein the controller is further configured to compare the rotation speed defined by the encoder of the disposable fluid pack with the measured rotation speed.

According to another embodiment, the reusable fluid dispenser further comprises a diluant inlet, the diluant inlet comprising a first end configured to be connected to a diluant source and a second end configured to be connected to a diluant inlet provided at the pump of the disposable fluid pack.

According to another embodiment, the reusable fluid dispenser further comprises an actuator, wherein activation of the actuator provides power from the power supply to the controller, the motor and the decoder.

According to another embodiment, the power supply comprises a mains power supply.

According to another embodiment, the power supply comprises a battery.

According to another embodiment, the power supply is also disposed within the housing.

According to another embodiment, the reusable fluid dispenser comprises a hand-held reusable fluid dispenser.

According to a third embodiment, a reusable fluid dispenser for use with a disposable fluid pack for dispensing fluids is provided. The reusable fluid dispenser comprises: a motor comprising a drive shaft, the drive shaft configured to form a power transmission coupling with a rotor of a pump of the disposable fluid pack, wherein the motor comprises a stepper motor comprising a shaft encoder and a decoder or a direct current motor comprising a shaft encoder and a decoder, the shaft encoder defining a rotation speed of the drive shaft; a second decoder and a lens array configured to retrieve encoder data from an encoder of the disposable fluid pack; a controller configured to rotate the drive shaft at the rotation speed defined by the shaft encoder, to receive the encoder data from the second decoder and to compare the rotation speed with a rotation speed measured by the encoder data; a power supply coupled to the controller, the motor and the decoder; and a housing, the motor, the decoder and the controller being disposed within the housing.

DESCRIPTION OF THE FIGURES

Embodiments will now be described with reference to the accompanying figures of which.

DETAILED DESCRIPTION

Reference will now be made in detail to the embodiments, examples of which are illustrated in the accompanying figures. In the following detailed description numerous specific details are set forth by way of examples in order to provide a thorough understanding of the relevant teachings.

However, it will be apparent to one of ordinary skill in the art that the present teachings may be practiced without these specific details.

A device for dispensing fluids comprising a reusable fluid dispenser and a disposable fluid pack for use with the reusable fluid dispenser is provided. Multiple different disposable fluid packs may be used with the same reusable fluid dispenser such that multiple different fluids may be dispensed at the same or at multiple different flow rates, without contaminating the reusable fluid dispenser or cross contamination between the different disposable fluid packs. The reusable fluid dispenser comprises a housing, a motor, a power supply, a controller, such as a motor controller printed circuit board (PCB), a decoder and a lens array. The disposable fluid pack comprises a fluid reservoir, a pump and an encoder. When in use, the motor of the reusable fluid dispenser is coupled to the pump of the disposable fluid pack to pump fluid from the fluid reservoir out through an outlet of the pump. The fluid does not contact the components of the reusable fluid dispenser, preventing cross contamination between different fluids. The encoder of each disposable fluid reservoir comprises encoder data defining at least one stop position and a dispensing flow rate for the fluid within the reservoir. The decoder of the reusable fluid dispenser retrieves the encoder data from the encoder when a disposable fluid pack is connected to the reusable fluid dispenser and instructs the motor to rotate the pump of the disposable fluid pack at the rotation speed defined in the encoder data to deliver a target flow rate. Since no expensive RFID or similar components are used, the device is suitable for sale on the domestic market as well as being a low-cost alternative to RFID based systems in the commercial market.

Figure 1:
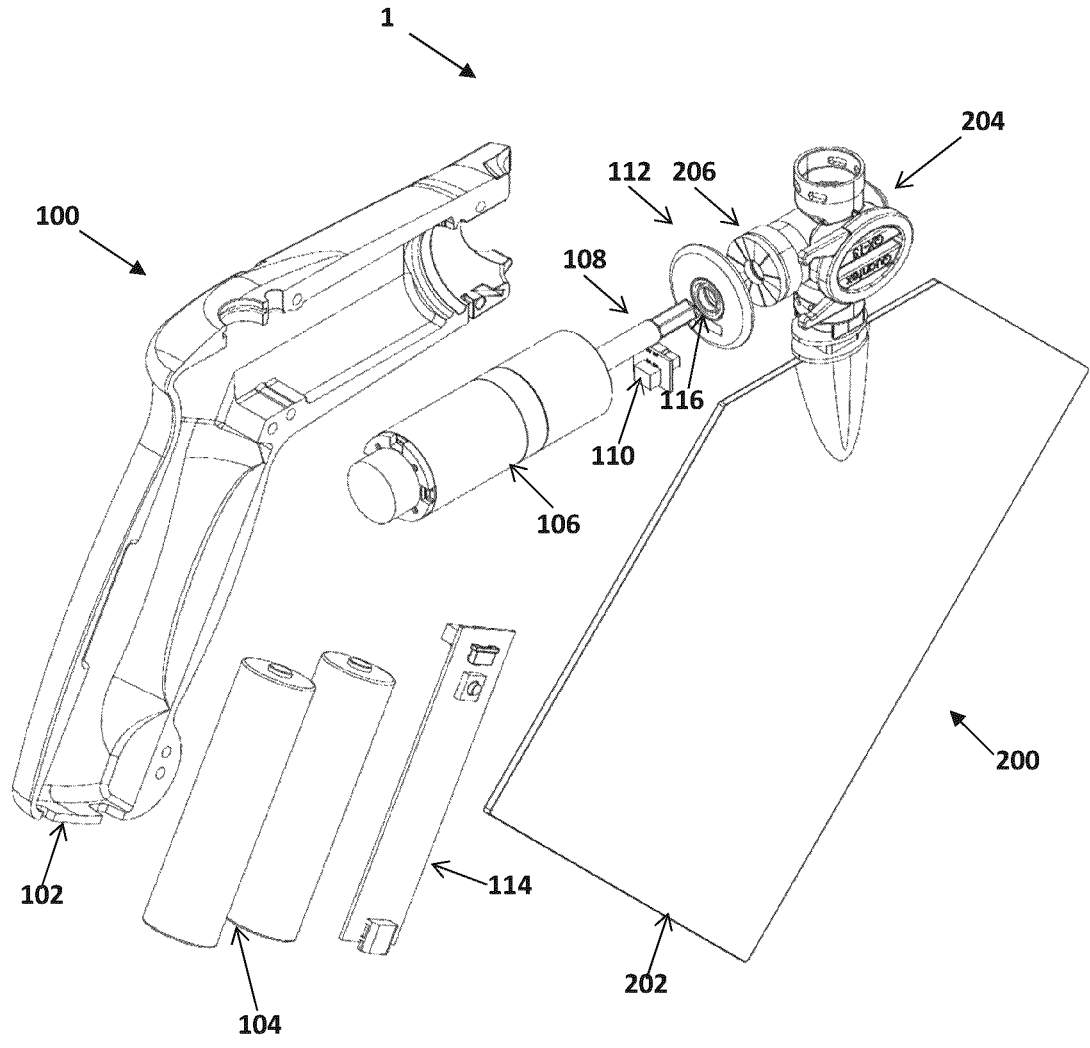
FIG. 1 illustrates an exploded view of a device for dispensing fluids.
Figure 2:
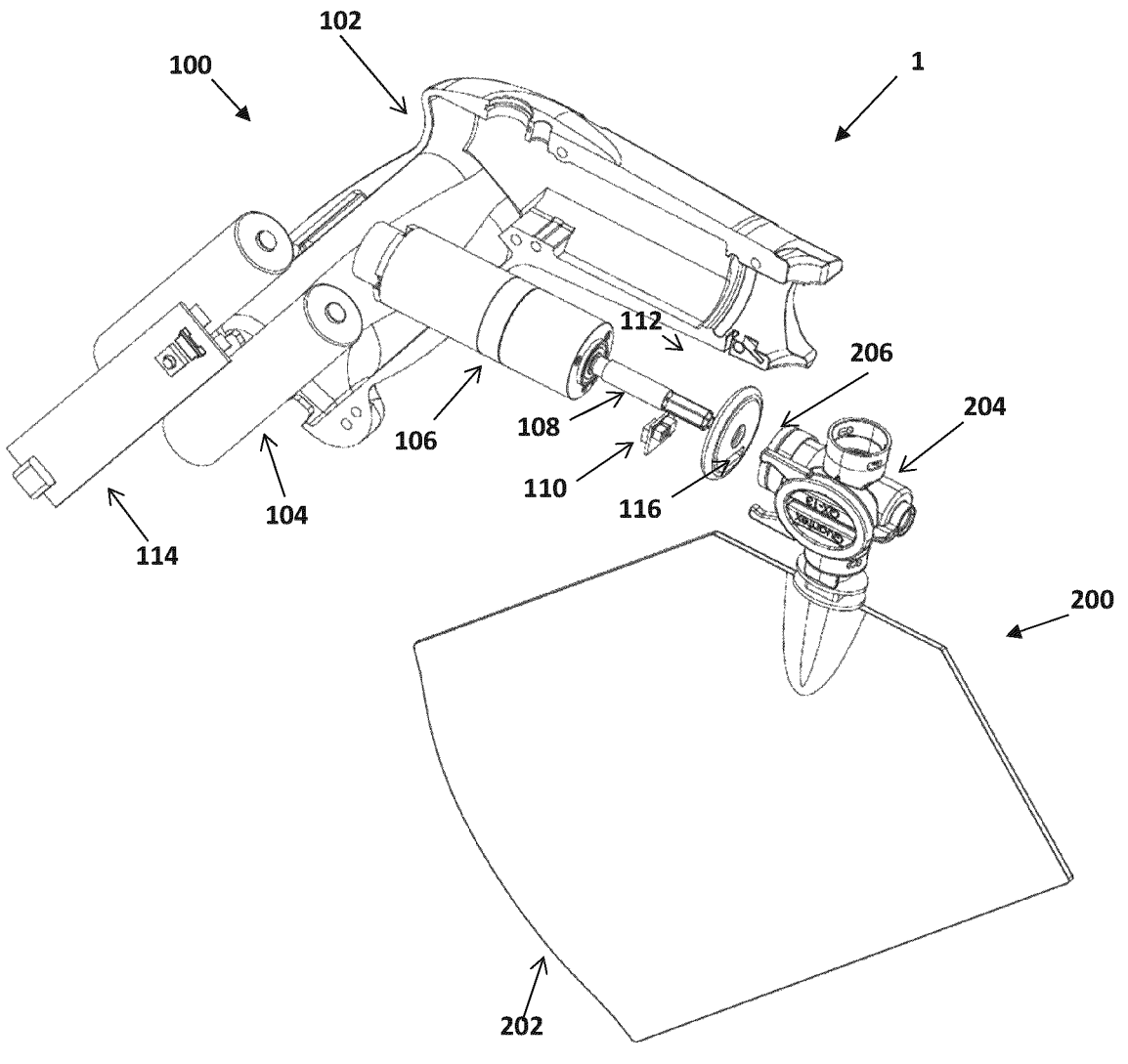
FIG. 2 illustrates an alternative exploded view of a device for dispensing fluids.

FIGS. 1 and 2 illustrate alternative exploded views of a device 1 for dispensing fluids. The device 1 comprises a reusable fluid dispenser 100 and a disposable fluid pack 200. The reusable fluid dispenser 100 comprises a housing 102, a power supply 104, a motor 106, a controller 114, such as a motor controller PCB, a decoder 110 and a lens array 116. The housing 102 is configured such that the motor 106, controller 114, the decoder 110 and the lens array 116 are disposed within the housing 102. In the embodiment illustrated in FIGS. 1 and 2, the power supply 104 is also disposed within the housing 102. However, the power supply 104 is not limited to being disposed within the housing 102. In the embodiment illustrated in FIGS. 1 and 2, the power supply 104 is a battery. However, a mains power supply may be utilised in which case a suitable connection to the mains power supply is provided in the housing 102, as opposed to a battery. Alternatively, the power supply 104 may be configured to be removably attached to but project out of the housing 102, similar to rechargeable batteries as known in the art of electric power hand tools. Alternatively, the reusable fluid dispenser 100 may be configured to utilise either or both a battery power supply and a mains power supply.

Figure 3:
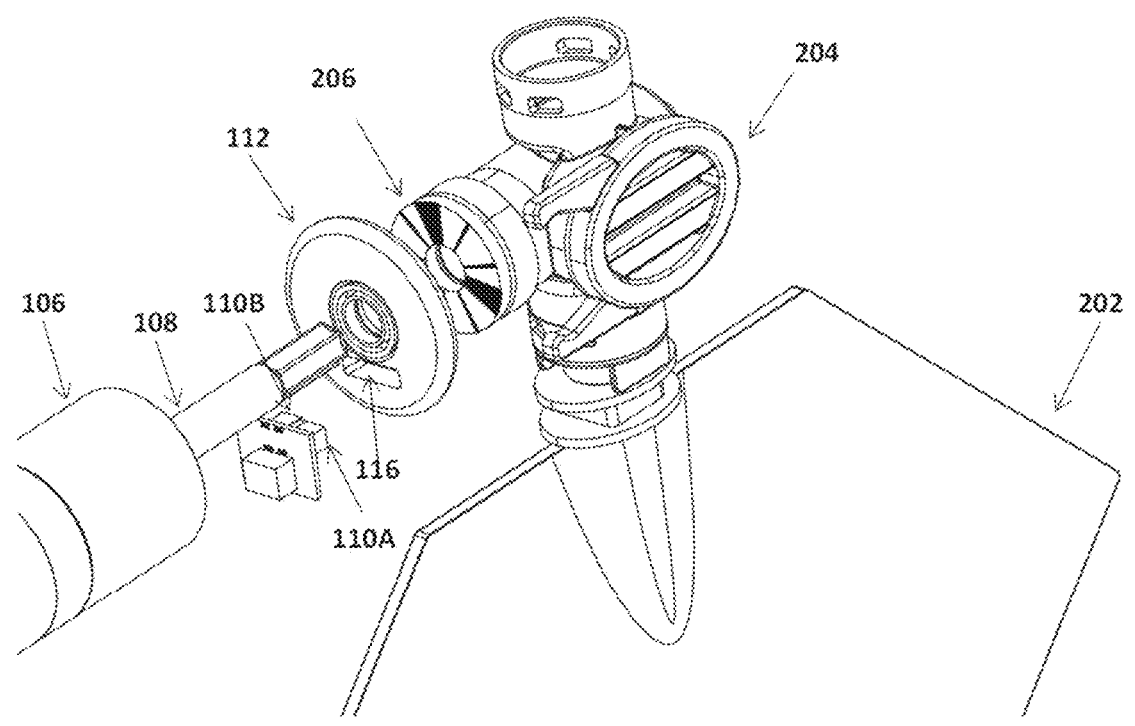
FIG. 3 illustrates a close up of an encoder of a disposable fluid pack and a decoder of a reusable fluid dispenser.

The motor 106, which is powered by the power supply 104 and controlled by the controller 114, comprises a drive shaft 108. The drive shaft 108 projects out of the housing 102 and is configured to be removably connected to a pump 204 of a disposable fluid pack 200 and to form a power transmission coupling with the rotor of the pump 204. As illustrated in FIGS. 1 to 3, the motor drive shaft 108 has a non-circular profile and the rotor of the pump 204 has a corresponding non-circular profile, such that the motor 106 may transmit rotational torque to drive the pump 204 of the disposable fluid pack 200, when a disposable fluid pack 200 is connected to the reusable fluid dispenser 100. In one embodiment, the motor drive shaft 108 profile comprises a plurality of splines/grooves and the pump 204 has a corresponding projection/lobe profile, such that the spline/grooves align with the projection/lobes when the motor drive shaft 108 is connected to a pump 204. However, other corresponding profiles may be utilised which form a power transmission coupling between the motor drive shaft 108 and the pump 204.

Figure 3A:
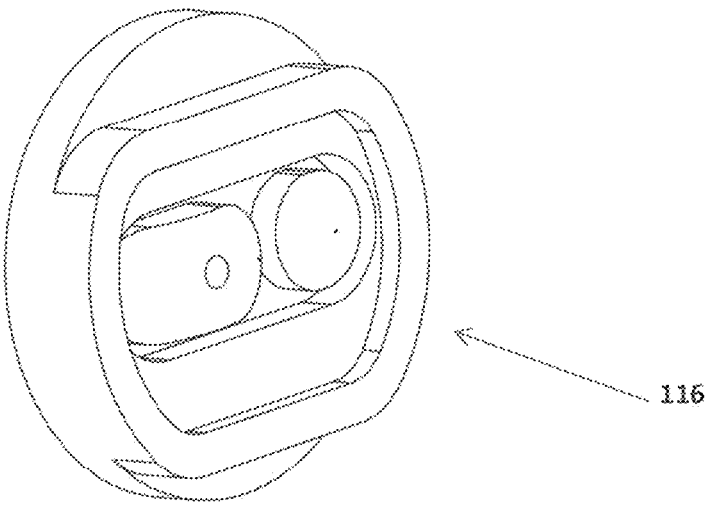
FIG. 3A illustrates a lens array.

FIGS. 1, 2 and 3 illustrate a lens array 116 provided between the decoder 110 and an encoder 206 of a disposable fluid pack 200. The lens array 116 comprises one or more lenses and preferably comprises two lenses as illustrated in FIG. 3A. The lens array 116 may be moulded from a plastic material transparent to the wavelength of the light emitted by the decoder 110 and preferably is moulded from red tinted Polycarbonate. In FIGS. 1 and 2 the lens array 116 is integrated into an optically clear bulkhead 112 and the decoder 110 of the reusable fluid dispenser 100 is provided in the housing 102. The bulkhead 112 is optically clear when the lens array 116 is unitary with the bulkhead. However, in other arrangements, the bulkhead may be opaque. In other arrangements, the decoder 110 may also be attached to the bulkhead 112 and/or the lens array 116 may be provided in the housing 102. The bulkhead 112 may be connected to the motor in the proximity of the drive shaft 108. A bulkhead 112 is just one known way of locating the decoder 110 and/or the lens array 116 and other means of attaching the decoder 110 and/or the lens array 116 to the reusable fluid dispenser 100 may also be utilised.

Although not illustrated, the decoder 110 is connected to the power supply 104 and the controller 114. According to one embodiment, the decoder 110 and the controller 114 may share the same PCB. As illustrated in FIGS. 1 to 3, the decoder 110 is provided at a fixed position relative to the axis of the motor drive shaft 108 such that the geometric relationship between the axis of the motor drive shaft 108, the decoder 110 and the lens array 116 is fixed. In addition, the encoder 206 of the disposable fluid reservoir 200 is coupled to and permanently aligned with a feature on the rotor, such as one of the projections/lobes on the pump 204, or some other predefined feature. Therefore, when a disposable fluid pack 200 is connected to the reusable fluid dispenser 100, the splines on drive shaft 108 align with the projections/lobes on the pump 204 of the disposable fluid pack 200, such that the radial and axial position of the rotor to the drive shaft 108 is aligned. The decoder 110, the lens array 116 and the encoder 206 become similarly aligned. The axial position of the encoder 206 is preserved by alignment of the rotor onto the motor drive shaft 108.

The decoder 110 is configured to retrieve encoder data from the encoder 206 of the disposable fluid pack 200 and instruct the motor to rotate the drive shaft 108 at a rotation speed defined by the encoder data. The decoder 110 reads the encoder 206 when the encoder 206 is rotating. When power is transmitted to the motor 106, it begins to rotate the drive shaft 108, resulting in the encoder 206 rotating. The decoder 110 is then able to retrieve the encoder data from the rotating encoder 206 and transmits it to the controller 114, and the controller 114 instructs the motor to rotate the drive shaft 108 at the defined rotation speed. When the reusable fluid dispenser 100 is deactivated, the motor 106 does not immediately stop, instead the controller 114 stops the motor at the next or nearest stop position. The controller 114 may process the signals received from the decoder to determine the speed, number of rotations etc.

FIG. 3 illustrates a close up of one embodiment of the encoder 206 of the disposable fluid pack 200 and the decoder 110 of the reusable fluid dispenser 100. The decoder 110 comprises a light emitter 110B and a light sensor 110A. The lens array 116 is positioned between the decoder 110 and the encoder 206. In order to retrieve encoder data from the encoder 206, a first lens of the lens array 116 is configured to focus light from the light emitter 110B and direct the focused light onto the encoder 206. Light reflected from the encoder 206 is gathered by a second lens of the lens array 116 and focused on to the light sensor 110A. The decoder 110 transmits the encoder data to the motor controller 114.

As can be seen from FIG. 3, the decoder 110 is aligned to view only a portion of the encoder 206 at any one time. The encoder 206 is coupled to the rotor and configured to rotate with the rotor, so that the portion of the encoder 206 which is viewed by decoder 110 changes during rotation. This is in contrast to known RFID systems where the RFID does not have a physical connection to the rotor.

The controller 114 may determine whether a disposable fluid pack 200 is/is not connected to the reusable fluid dispenser 100. The light emitter 110B emits modulated light. Consequently, even if light is detected by the light sensor 110A when a disposable fluid pack 200 is not present, the controller 114 is able to determine whether the sensed light is below a predetermined threshold. Sunlight or light from another source detected when a disposable fluid pack 200 is not connected to the reusable fluid dispenser 100 will be below the predetermined threshold. Therefore, the controller 114 can determine that a disposable fluid pack 200 is not connected and can prevent the motor from being activated.

In addition, the light sensor 110A may detect some light reflected from the light emitter 110B even by the black markings provided on the encoder 206. However, since the light is modulated, the controller 114 can determine that this light is reflected light and not sunlight or light from another source, confirming that a disposable fluid pack 200 is connected to the reusable fluid dispenser 100.

The reusable fluid dispenser 100 is designed to be used multiple times with different disposable fluid packs 200. Consequently, the more "expensive" and less "recyclable" components, such as the motor 106, controller 114 and decoder 110 are provided in the reusable fluid dispenser 100, whilst the "cheaper" components, such as the encoder 204, which is a relatively cheap component, when compared to the known RFID systems are provided in the reusable fluid dispenser 100. In addition, since the reusable fluid dispenser 100 is designed to be used with different disposable fluid packs 200, the orifice 208 through which the fluid exits and the pump 204 is provided as part of the disposable fluid pack 200. Therefore, the fluid does not flow through the components of the reusable fluid dispenser 100 and there is no cross contamination when different disposable fluid packs 200 are used with the same reusable fluid dispenser 100. In addition, there is no need to clean the orifice 208 and fluid reservoir 202 between uses since the disposable fluid packs 200 may be discarded once the fluid reservoir 202 is empty.

The disposable fluid pack 200 comprises a fluid reservoir 202 which is prefilled with a fluid. An orifice 208 (illustrated in FIGS. 4 and 5 as a nozzle) is connected to an outlet of the pump 204, such that the orifice 208 is in fluid communication with the fluid reservoir 202. In addition, a pump 204 comprising a rotor is configured to pump the fluid from the fluid reservoir 202, in a first direction, out of the orifice 208 when the disposable fluid pack 200 is attached to a reusable fluid dispenser 100. The pump may be a uni-directional pump 204. Alternatively, the pump may be a bi-directional pump and may also be able to pump the fluid in a second direction, the second direction being the opposite direction to the first direction. The ability to run the pump in reverse i.e., from the pump outlet to the pump inlet may be used to clean the nozzle after each use.

In FIGS. 1 to 5, the fluid reservoir 202 is directly connected to an inlet of the pump 204, such that an opening of the fluid reservoir 202 is closed by the pump 204 and the inlet of the pump 204 is in direct fluid communication with the fluid in the fluid reservoir 202. In addition, the outlet of the pump 204 is directly connected to the orifice 208. However, a supply tube may be provided to connect the fluid reservoir 202 to the inlet of the pump 204. Alternatively, or in addition, a supply tube may be provided to connect the outlet of the pump 204 to the orifice 208. Consequently, the fluid reservoir 202 may be provided remote from the pump 204 and/or the orifice 208 may be provided remote from the pump 204.

The fluid reservoir 202 may be a collapsible fluid reservoir 202 such as a pouch, bag, airless bottle or bellows, which enables a pump 204, having a high vacuum capability, to draw all of, or substantially all of, the fluid from the fluid reservoir 202. In addition, a collapsible reservoir fluid reservoir 202, which collapses as the fluid is extracted, may prevent the ingress of air and may prolong the life of many fluid types. The fluid reservoir 202 may comprise a rigid outer casing having a non-rigid liner within the rigid outer casing, the non-rigid liner configured to collapse as liquid is drawn out. Alternatively, the fluid reservoir 202 may comprise a rigid outer casing where a bung is drawn in as the liquid is sucked out, such as a syringe/vial format.

It is possible to use different sized disposable fluid packs 200, having different volumes of fluid within each reservoir 202, with the reusable fluid dispenser 100.

Figure 6A:
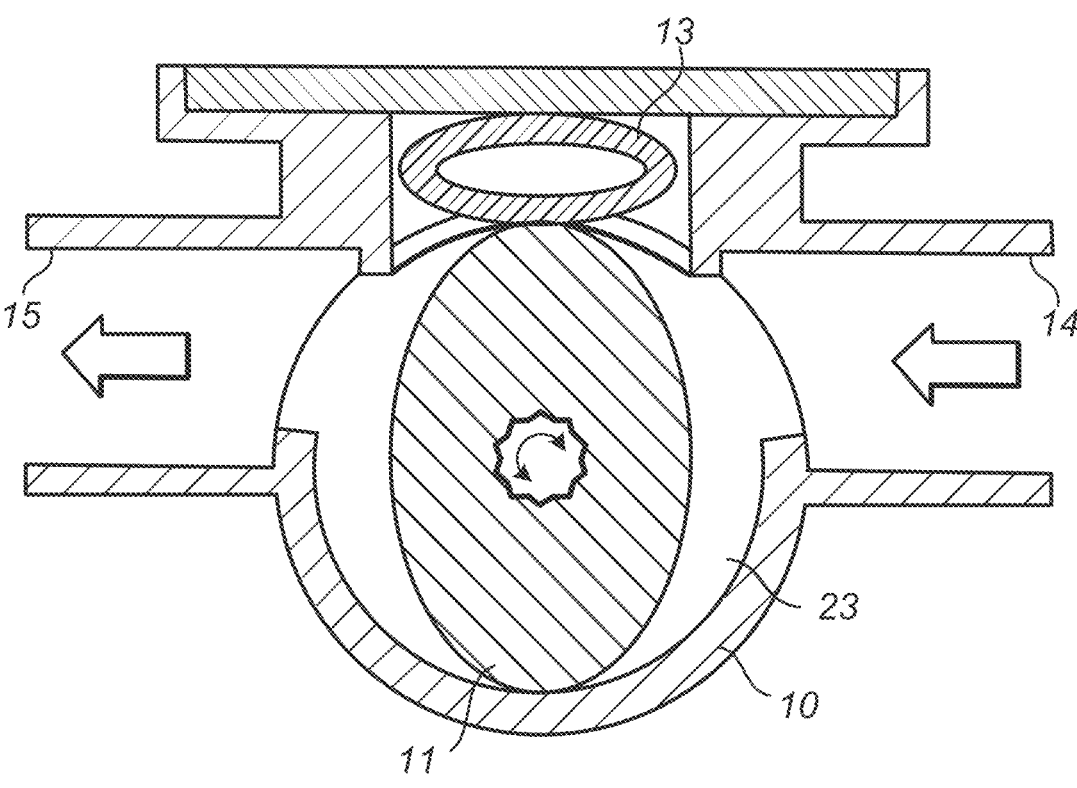
FIG. 6A illustrates schematically a 2-bolus rotary pump.

The pump 204 may be a Quantex™ single use pump, such as one of the pumps described in WO 2006/027548 A1 or WO 2013/050491 A1. FIG. 6A illustrates schematically an exemplary 2-bolus rotary pump. The pump of FIG. 6A comprises a rotor 11 which is interference fit in a pump housing 10. Two chambers 23, 24 are formed between the rotor 11 and the pump housing 10, each chamber 23, 24 creating a bolus which is constrained by the walls of the pump housing 10 as the rotor 11 rotates within the pump housing 10. As the rotor 11 rotates within the pump housing 10, a vacuum is created causing fluid from the fluid reservoir 202 to be sucked into the chamber 23 (via the inlet 14) and fluid in the chamber 24 to be transported to the orifice 208 (via the outlet 15). As the rotor continues to rotate, each bolus of fluid is transported around the pump from the inlet 14 to the outlet 15.

Figure 6B:
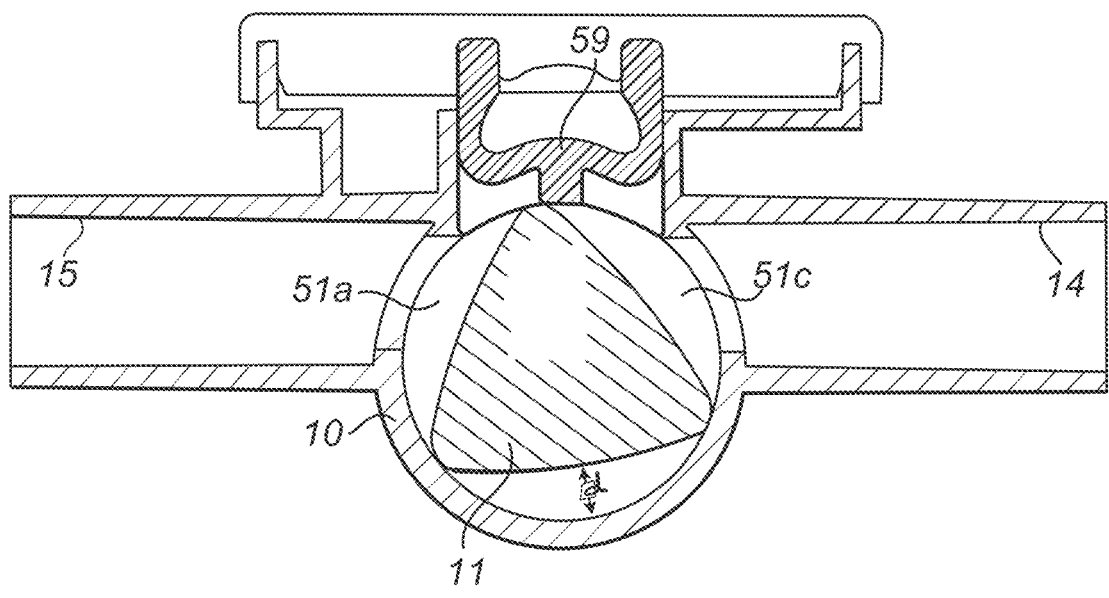
FIG. 6B illustrates schematically a 3-bolus rotary pump.

The pump may be a 2, 3, 4, or 5-bolus pump having 2, 3, 4, or 5 chambers respectively. FIG. 6B illustrates schematically a 3-bolus rotary pump. The pump of FIG. 6B also comprises a rotor 11 which is interference fit in a pump housing 10. However, the rotor 11 of FIG. 6B is a curved triangular shape, such that three chambers 51a, 51b, 51c are formed between the rotor 11 and the pump housing 10, each chamber 51a, 51b, 51c creating a bolus which is constrained by the walls of the pump housing 10 as the rotor 11 rotates within the pump housing 10.

FIG. 6A illustrates the rotor 11 in a top dead centre (TDC) positions where the spring means 13 is at its most compressed. A pump 204 having a 2-bolus rotor is to be stopped in any one of two bottom dead centre (BDC) positions. With reference to FIG. 6A, BDC is a further rotation of the rotor 11 by 90°, where the spring means 13 is least compressed. BDC is desirable because the spring means 13, being made of rubber, takes a compression set over time and the less compressed it is whilst not in use the better.

A pump 204 having a 3-bolus rotor is to be stopped in any one of three BDC positions. With reference to FIG. 6B, BDC is a further rotation of the rotor 11 by 60°, where the spring means 59 is least compressed. A pump 204 having a 4-bolus rotor is to be stopped in any one of four BDC positions. A pump 204 having a 5-bolus rotor is to be stopped in any one of five BDC positions. A pump having a bolus rotor having more than 5 bolus' may also be utilised if appropriate.

Preferably, the pump 204 has high vacuum capability enabling it to draw all of, or substantially all of, the fluid from the fluid reservoir 202, when the fluid reservoir 202 is a collapsible fluid reservoir 202, whilst maintaining a consistent output flow rate. Consequently, there is less waste since substantially all of the fluid can be drawn from the fluid reservoir by the pump 204.

The encoder 206 of the disposable fluid pack 200 comprises encoder data which defines: 1) at least one stop position of the rotor; and 2) a speed of rotation of the rotor. The position and number of stop positions is selected in dependence on the type of pump 204 used in the disposable fluid pack 200. When the pump 204 comprises one or more BDC positions, then the stop position should be aligned with one of the BDC positions. For example, if the pump comprises a 3-bolus rotor, then 1 stop position may be defined (i.e., any one of BDC positions) or 3 stop positions may be defined (i.e., at each of the BDC positions), such that the rotor may be stopped at any one of the 3 stop positions. The TDC may be used as the stop positions instead of the BDC if required. When more than one stop position is defined, then the stop positions must be equally spaced apart.

At least one stop position is required so that the rotor may be stopped at (and started from) a known position. If the rotor was not stopped at a known position, then it would be difficult to connect another disposable fluid pack 200, since the splines and lobes would not be aligned. In particular, the high torque required to back-drive the gear box of the motor 106 may prevent the drive shaft 108 from being rotated unless the motor is being powered and the pump is axially and angularly constrained by the housing 102. Consequently, the pumps 204 of each new disposable fluid pack 200 are provided with at least one stop position in a known, consistent, position.

Since the pump 204 is started from a known position, the number of revolutions performed each use may be determined by the controller 114, which correlates to the dispensed volume of fluid.

The rotation speed defined at the encoder 206 sets the flow rate at which the fluid from the fluid reservoir 202 is supplied to and dispensed from the orifice 208. The rotation speed is set in dependence on the type of fluid within the fluid reservoir 202. In addition, the type of orifice 208 may be selected in dependence on the type of fluid within the fluid reservoir 202. As is well known, different types of fluids have different viscosities and rheologies and therefore, may require different dispensing flow rates. Consequently, each disposable fluid pack 200 may comprise a different fluid, an orifice 208 selected in dependence on the type of fluid within the fluid reservoir 202 and an encoder 206 defining a flow rate required to dispense the fluid through the orifice 208. The flow rate together with the size and type of orifice 208 and rheology of the fluid dictates the dispensing pressure, as known in the art.

Figure 4:
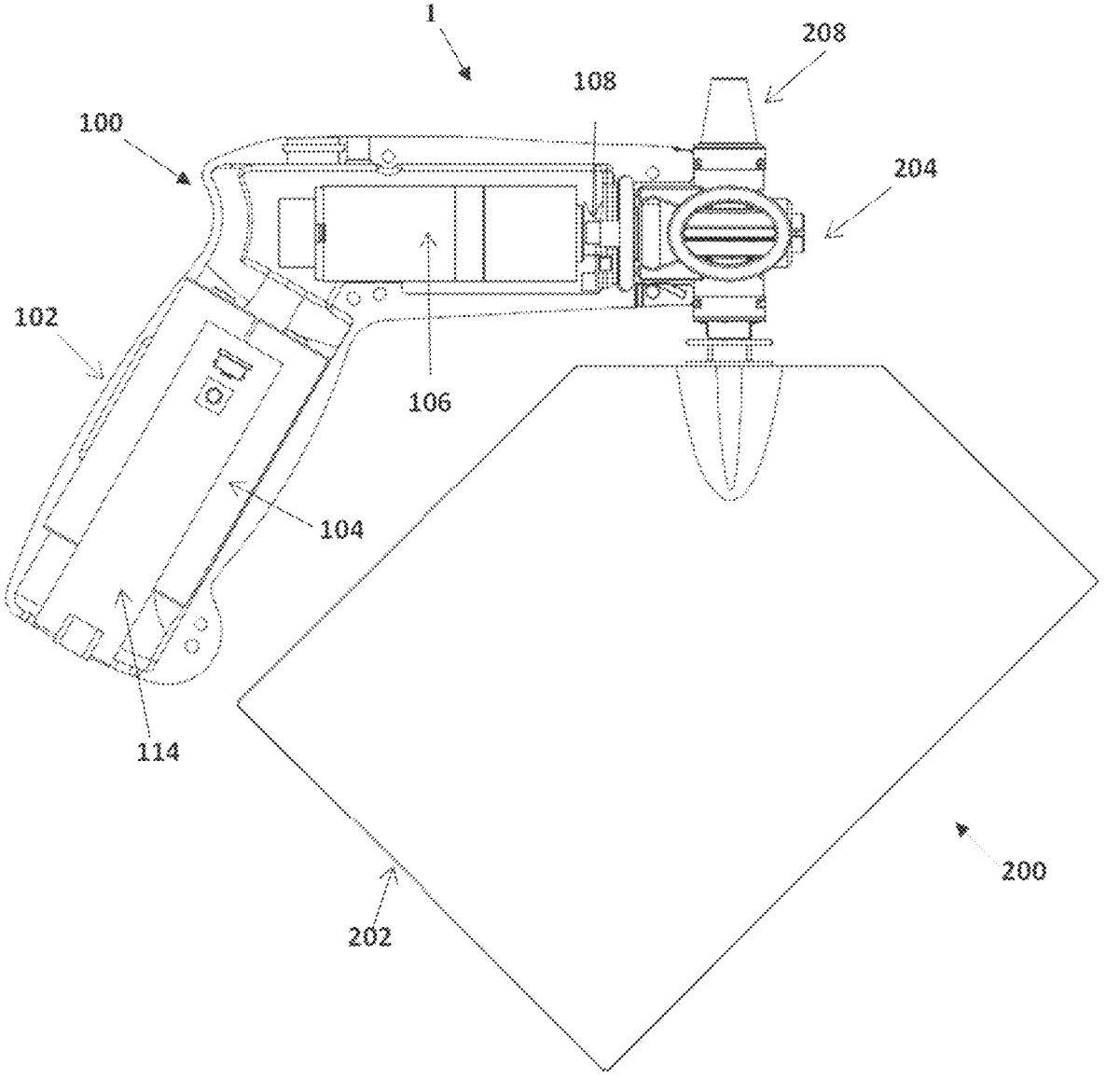
FIG. 4 illustrates a device for dispensing fluids having an orifice as a nozzle.
Figure 5:
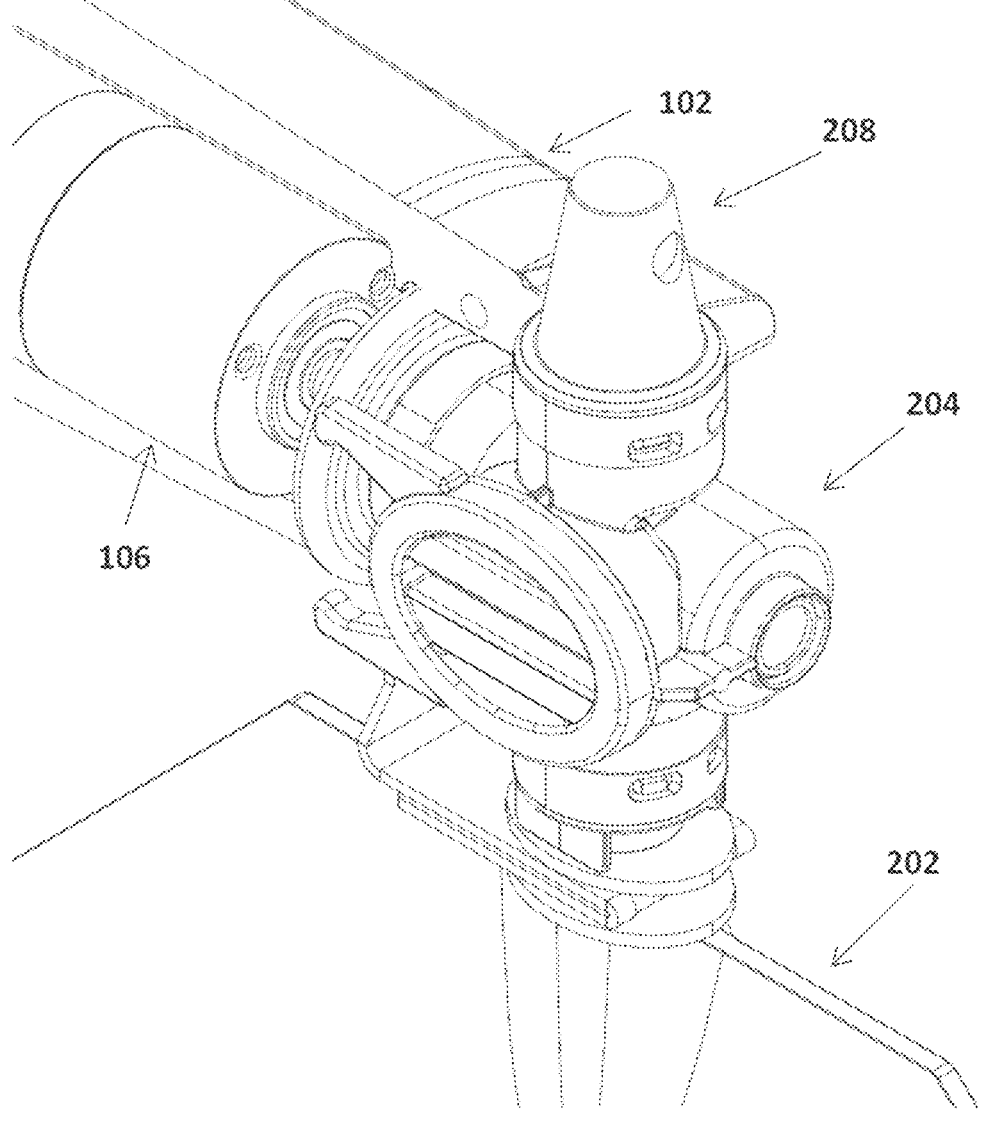
FIG. 5 illustrates a close up of an orifice as a nozzle.

FIGS. 4 and 5 illustrate the orifice 208 as a nozzle. However, other types of orifices may be used, for example, the orifice 208 may comprise an infusion line coupled to the outlet of the pump when the device 1 is to be used in the medical field. In addition, the outlet of the pump may be coupled to a medical device/equipment. In one embodiment, when the device 1 is to be used in the medical field, information from the decoder may be communicated from the decoder 110 or the controller 114 to the medical device/equipment.

Since the orifice 208 is provided as part of the disposable fluid pack 200, a different type of orifice 208 may be provided dependant on the fluid within the reservoir 202. The orifice 208 may comprise a plurality of the same or different sized orifice exit holes. A plurality comprises one or more. The size and/or number and/or position of exit holes in the orifice may be altered in dependence on the fluid within the reservoir 202. For example, it may be desirable to dispense some fluids as a fine mist, in which case, the orifice may have many small exit holes or as a foam, in which case the orifice may introduce air into the fluid flow. The size and/or number and/or position of exit holes in the orifice may be selected dependent on the spray pattern which is required. Furthermore, the size and/or number and/or position of exit holes in the orifice may be selected dependent on the viscosity of the fluid within the reservoir 202. Consequently, the reusable fluid dispenser 100 may be used with numerous different disposable fluid packs 200 to dispense different types of fluids at different flow rates and with different spray patterns.

The disposable fluid pack 200 is configurable dependant on the type of fluid to be dispensed. A disposable fluid pack 200 may be constructed having a fluid reservoir 202 of a material and size selected to be suitable for the fluid, and an orifice 208 selected based on the viscosity of the fluid and the flow rate and/or spray pattern required. The pump 204 may be a single use pump or single use dilution pump (discussed in further detail below).

The device 1 may be used with a removable wand, such as a rigid tube or flexible hose which is attached at its first end to the outlet of the pump. The wand may comprise a nozzle at its second end through which the fluid exits. The wand provides a user of the device greater reach and flexibility when directing the exiting fluid, such that the device 1 is positioned at a distance from the exiting fluid. In addition, as discussed above, a supply tube may be provided to connect the fluid reservoir 202 to the inlet of the pump 204, such that the fluid reservoir 202 may be provided remote from the pump 204 and/or such that large/heavy fluid reservoirs 202 may be used.

The encoder 206 may be an encoder disc or an encoder sleeve or an encoder drum, which is attached to the rotor of the pump 204. The encoder is coupled to the rotor of the pump 204 at a predefined position and is configured to rotate with the rotor of the pump 204.

Figure 7:
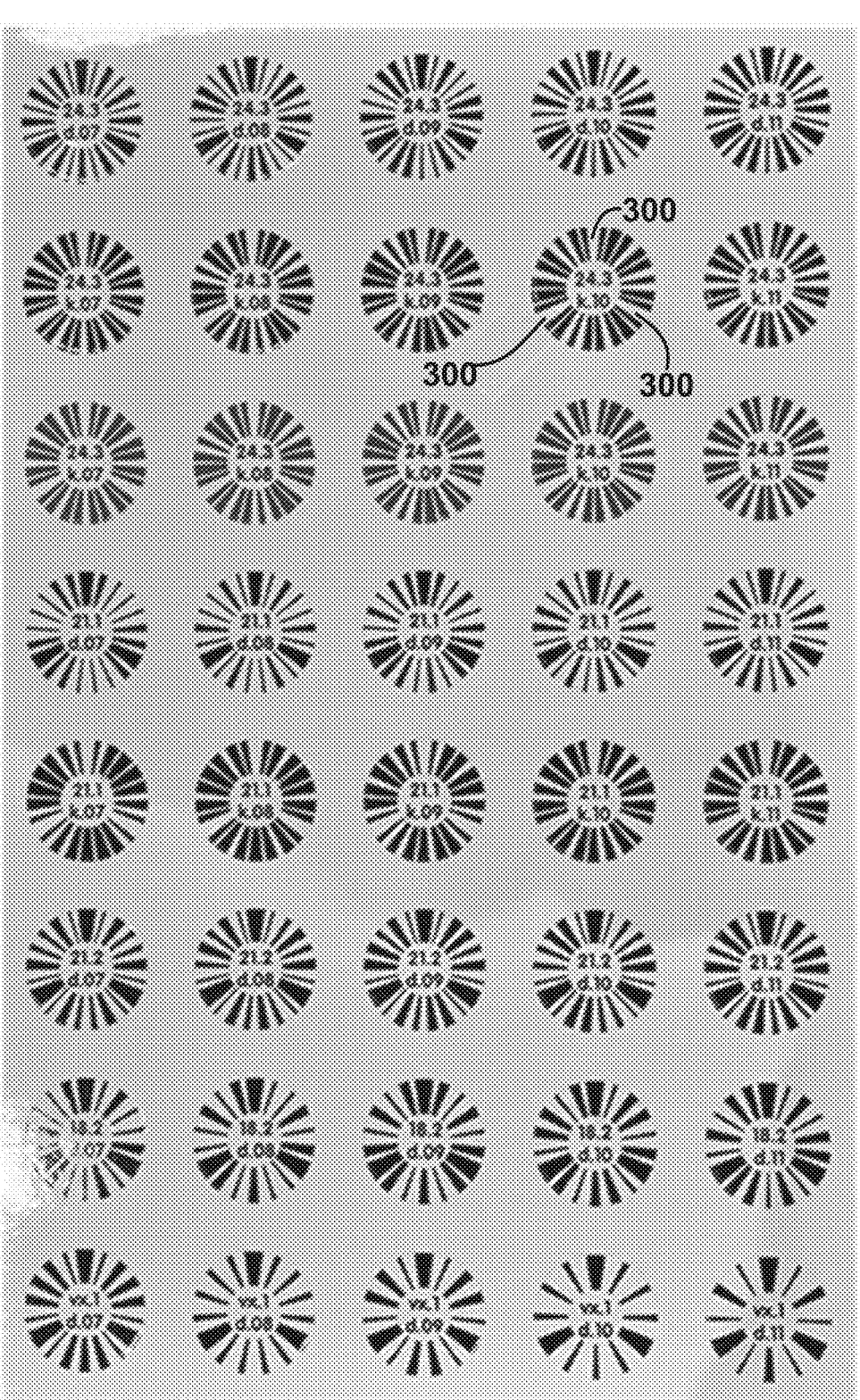
FIG. 7 illustrates a plurality of encoder discs.
Figure 8:
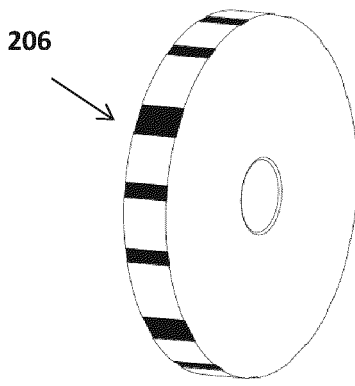
FIG. 8 illustrates an encoder sleeve or an encoder drum.

FIGS. 1, 3 and 7 illustrate encoder discs whilst FIG. 8 illustrates an encoder sleeve or drum. As illustrated in FIGS. 1, 3 and 7, an encoder disc comprises marking arranged on the same plane as the surface of the disc, in contrast, as illustrated in FIG. 8, an encoder sleeve or drum comprises markings arranged radially around the periphery of the sleeve or drum. An encoder drum is a separate element that attaches to the rotor of the pump 204, whereas an encoder sleeve is a printed wrapper that wraps around an extended portion of the rotor of the pump 204. Alternatively, the encoder sleeve may comprise markings printed or etched radially around the extended portion of the rotor of the pump 204. The encoder disc may be a separate disc which is attached the rotor or may be printed or etched directly onto the rotor. The encoder 206 may be attached to or printed or etched onto the rotor at the time of manufacture of the pump 204, or at the time of attaching the pump 204 to the fluid reservoir 202, or at the time of filling the fluid reservoir 202 with a particular fluid. The encoder 204 may be attached to the rotor shaft on the pump 204.

As discussed above, when a disposable fluid pack 200 is connected to the reusable fluid dispenser 100, the drive shaft 108 aligns with the pump 204, such that the radial and axial position of the rotor to drive shaft 108 is aligned, for example the splines of a drive shaft 108 align with lobes of a pump 204. Since the encoder 206 is attached to the rotor of the pump 204 at a predefined position, when a disposable fluid pack 200 is connected to the reusable fluid dispenser 100, the encoder 206 is aligned with the decoder 110 and the lens array 116.

FIG. 7 illustrates a plurality of exemplary encoder discs. Each encoder disc has printed or etched markings (also referred to as the encoder data). The markings define segments of a specific width that indicate the bottom dead centre (BDC)/stop positions of the rotor of the pump 204. The encoder discs of FIG. 7 are designed for a 3-bolus rotor and the lines 300 indicate 3 stop positions. The BDC positions of the 3-bolus rotor are the stop positions provided so that the reusable fluid dispenser 100 is able to stop the pump 204 at the nearest BDC position on the rotor. Additional markings are provided on each encoder disc (i.e., the contrasting lines) between the stop position(s) which define the speed of rotation of the rotor. The frequency of the markings between the stop positions (i.e., the BDC positions in FIG. 7) affects the resolution: the more markings, the higher the resolution as the loop response is faster and thereby improves the accuracy of the speed regulation. The markings are repeated between each stop position. The markings between each stop position have different widths and pitches, when compared to the width of the stop position markings, which allows information to be encoded such as speed of rotation, direction of rotation, angular velocity, acceleration, deceleration, and angular distance. Angular distance instructs the reusable fluid dispenser 100 to dose X number of revolutions in a first direction (i.e., forward) and Y number of revolutions in a second direction (i.e., reverse) for each actuation of the actuator. Operation in the reverse direction causes a reverse direction of flow of fluid from the outlet back towards the reservoir 202. This may prevent the nozzle 208 from becoming clogged and/or may reduce oxidation of the fluid at the end of each use. These markings may also provide additional information such as pack information. The pack information may comprise any desirable information as required, such as the type of fluid within the reservoir, the volume of fluid within the reservoir, a use by date for the fluid within the reservoir, a manufacturing date etc. The stop position markings together with the intermediary markings are used for motor loop control to maintain a constant motor speed independent of torque and supply voltage changes. Alternatively, to the segments of a specific width that indicate the one or more stop positions, a projection or recess on the encoder 206 may define the one or more stop positions.

As illustrated in FIG. 7, the encoder discs are all different, each defining a different speed of rotation. As mentioned above, the speed of rotation may be selected dependant on the fluid within the fluid reservoir 202. Thus, the appropriate encoder 206 is used dependent on the fluid within the reservoir 202, the orifice 208 and the type of pump 204 used. Moreover, because at least one stop position and the speed of rotation is defined by the encoder 206, the controller 114 can determine the number of revolutions and thereby calculate the dose volume delivered per use. Although known RFID's can provide information about a pack and pump type (e.g., 2 or 3 bolus rotor), known RFID's do not know the position of the rotor during use and cannot count the number of revolutions that have been executed.

As an alternative to attaching an encoder disc or sleeve to the pump 204, the encoder 206 may be applied directly to the pump 204 at the time of manufacture of the pump, for example the encoder markings may be etched by a laser directly onto the rotor of pump 204 or may be printed directly onto the rotor of pump 204.

The pump 204 is not limited to being a pump as described above having 2 or more boluses and other types of pumps may be used. When such an alternative pump is used, the encoder 206 may define only one stop position that is detected every full revolution of the rotor for determining the number of revolutions performed each use. Markings are also provided on each encoder disc which define the speed of rotation of the rotor, acceleration, deacceleration and pack information.

When a disposable fluid pack 200 is connected to a reusable fluid dispenser 100, the decoder 110 reads the encoder data and operates the pump 204 at the speed of rotation defined by the encoder 206 and stops the pump at the nearest stop position defined by the encoder 206. As discussed above, the decoder 110 directs light, from a light emitter 110B, at the encoder 206, such as illustrated in FIG. 7, and uses a light sensor 110A to measure the reflected light. The light sensor 110A measures the reflected light received from the markings of the encoder 206 and transmits a signal to the controller 114. The signal from the decoder 110 is processed by the controller 114 to extract the encoder data which includes the at least one stop position. This encoder data may be used to set a defined motor speed which may include an acceleration/deacceleration profile, as well as identifying information about the disposable fluid pack 200. The lines may be black and white or another contrasting colour combination of wavelengths compatible with the light sensor 110A.

When a disposable fluid pack 200 is connected to a reusable fluid dispenser 100, the encoder 206 is provided within a cavity of the reusable fluid dispenser 100, as illustrated in FIGS. 4 and 5. The cavity is a close dimensional fit to prevent ambient light reaching the lens array 116 and in particular the light sensor 110A, which may otherwise reduce the performance of the device 1.

The reusable fluid dispenser 100 is able to deliver the correct flow rate for any liquid provided in a disposable fluid pack 200 which is connected to the reusable fluid dispenser 100. Each disposable fluid packs 200 instructs the reusable fluid dispenser 100 as to which speed the motor 106 is to rotate. This is in contrast to conventional dispenser devices, where it is the dispenser device which instructs the pump as to which speed to rotate.

The pump 204, encoder 206 and orifice 208 are integrated with the fluid reservoir 202, such that the pump 204, encoder 206 and orifice 208 are all discarded as part of the disposable fluid packs 200 once the fluid reservoir 202 is empty.

The reusable fluid dispenser 100 is configured to connect to the disposable fluid pack 200. In addition to the motor drive shaft 108 of the reusable fluid dispenser 100 connecting to the rotor of the disposable fluid pack 200 when a disposable fluid pack 200 is connected by an end user to the reusable fluid dispenser 100, a releasable attachment means may also be provided. The releasable attachment means may be any releasable attachment device configured to connect the pump 204 and encoder 206 of the disposable fluid pack 200 to the reusable fluid dispenser 100 and to counter the torque created when the motor 106 is activated and thus keep the pump 204 in position. The releasable attachment device is releasable in that it is also configured to disconnect the pump 204 from the reusable fluid dispenser 100, such that the reusable fluid dispenser 100 may be used with another disposable fluid pack 200.

Figure 9:
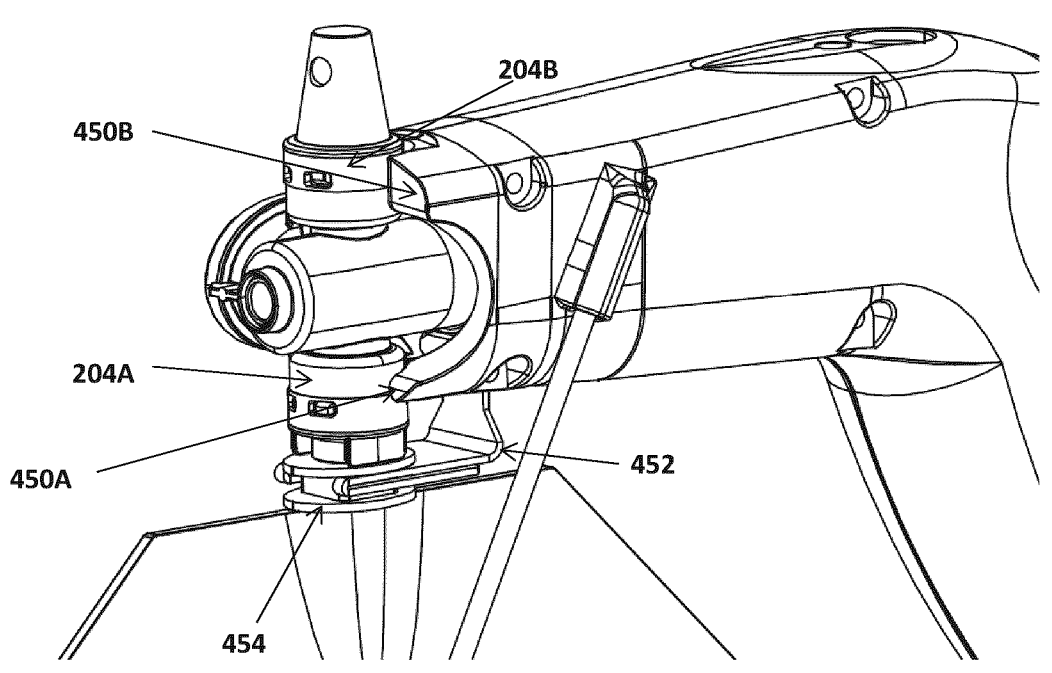
FIG. 9 illustrates an attachment means for attaching a reusable fluid dispenser to a disposable fluid pack.

As can be seen in FIGS. 4 and 9, when the motor drive shaft 108 is connected to the rotor of the disposable fluid pack 200, the pump 204 is located in a cavity of the fluid dispenser 100 and the forked slots 450A, 450B of the fluid dispenser 100 clip around the inlet 204A or outlet 204B or both of the pump 204. In addition, since the encoder 206 is attached to the rotor at a predefined position, it is also provided within the cavity of the reusable fluid dispenser 100.

The releasable attachment means may be provided at the reusable fluid dispenser 100 and/or at the disposable fluid pack 200.

FIG. 9 also illustrates an attachment means comprising a forked slot 452 provided at the reusable fluid dispenser 100 into which the complimentary bracket 454 provided at the disposable fluid pack 200 slots. As illustrated in FIG. 9, both the reusable fluid dispenser 100 and the disposable fluid pack 200 are guided into axial alignment by features on the reusable fluid dispenser 100 and the disposable fluid pack 200. When the drive shaft 108 of the reusable fluid dispenser 100 engages with the rotor of the pump 204 of a disposable fluid pack 200, such that a power transmission connection is made, the bracket 454 connects to the forked slot 452. The bracket 454 and the forked slot 452 are provided to hold the fluid reservoir 202. As described above, the fluid reservoir 202 may be connected to the pump via a supply tube, such that the fluid reservoir 202 is some distance away, in this arrangement the forked slot 452 is not utilised.

The reusable fluid dispenser 100 also comprises an actuator, such as a lever, switch or button, provided on the housing. The actuator, when activated, such as pushed, pulled or flipped, provides power from the power supply to the controller 114 and in turn to the motor 106, which activates the motor 106. The motor 106 in turn rotates the rotor of the pump 204, to dispense the fluid from the reservoir 202. Activation of the actuator also provides power from the power supply to the controller 114 and in turn to the decoder 110, such that the decoder 110 can read the encoder 206. Signals from the decoder 110 are sent to the motor controller 114 and in turn to the motor 106 to control the speed of rotation and thus fluid flow rate. The actuator may be required to be held by a user in the active position during use of the reusable fluid dispenser 100, such that when a user removes their finger/hand from the actuator the motor stops. According to one embodiment, the motor may only be activated when a disposable fluid pack 200 is connected to the reusable fluid dispenser 100 to prevent the motor stopping in an arbitrary position rather than an encoder informing the controller 114 of the nearest stop position. According to one embodiment the de-activation of the actuator causes the controller to inform the motor to stop at the nearest stop position before powering down. According to one embodiment, de-activation of the actuator causes the controller 114 to inform the motor to operate in the reverse direction of rotation for a defined period (such as a number of cavities on the rotor) before powering down causing a reverse direction of flow of fluid from the outlet back towards the reservoir 202. This may prevent the nozzle 208 from becoming clogged and/or may reduce oxidation of the fluid.

Figures 10, 11:
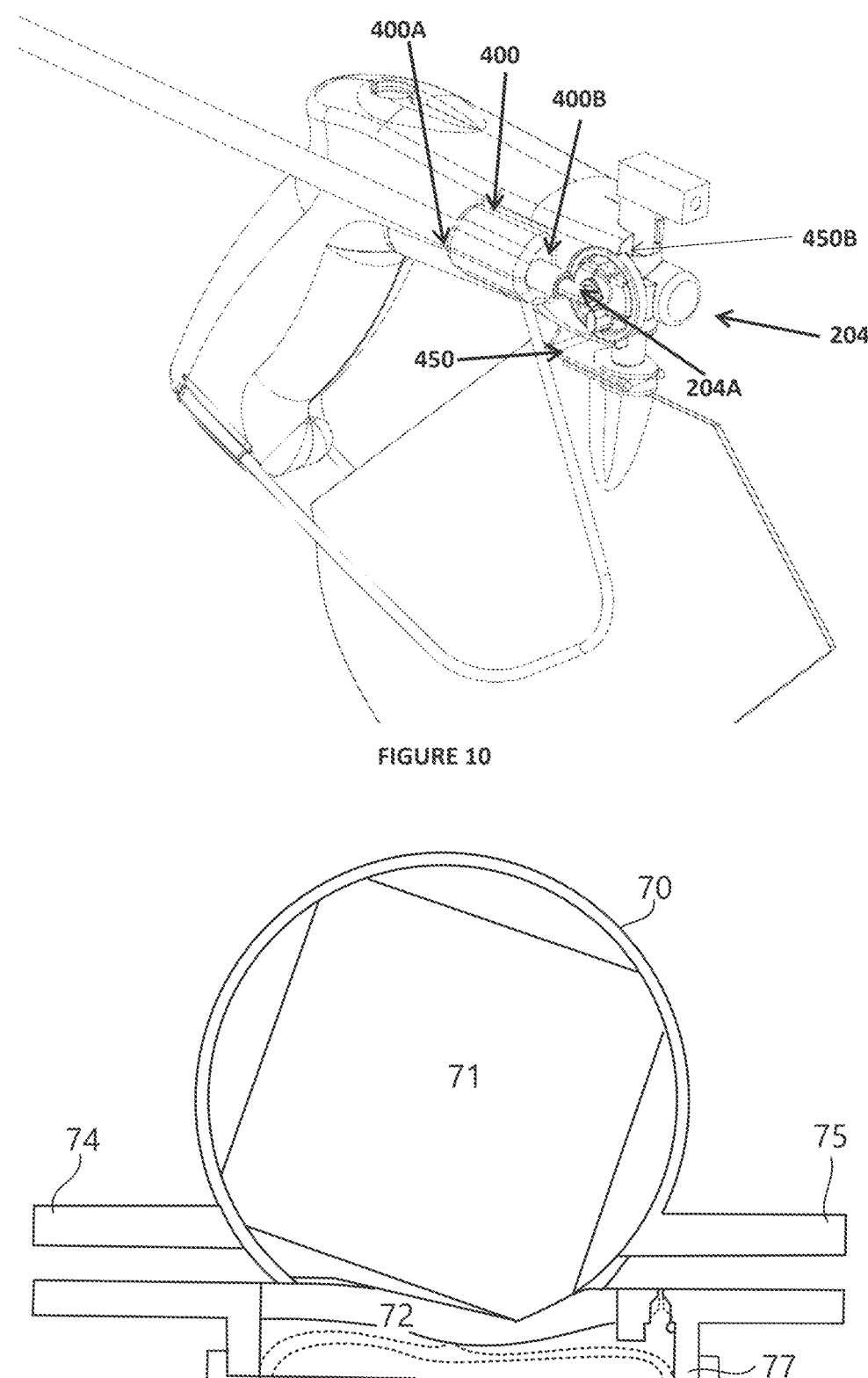
FIG. 10 illustrates a reusable fluid dispenser comprising a diluant inlet.
FIG. 11 illustrates schematically a dilution rotary pump.

The fluid reservoir 202 of the disposable fluid pack 200 may contain a concentrate which is to be mixed with a diluant, such as water, at the device 1. FIG. 10 illustrates a reusable fluid dispenser 100 further comprising a diluant inlet 400. A pipe, such as a hose pipe, for delivering the diluant, is connected to a first end 400A of the diluant inlet 400 of the reusable fluid dispenser 100. The other end 400B of the diluant inlet 400 is connected to a diluant inlet 204A provided at the pump 204 of the disposable fluid pack 200, when a disposable fluid pack 200 is connected to the reusable fluid dispenser 100. FIG. 10 illustrates the diluant inlet 204A as a tube which is part of the pump 204. The diluant inlet 204A is in fluid connection with the pipe which delivers the diluant. When the pump 204 is mounted onto the motor drive shaft 108 to make a power transmission connection, a fluid connection is made at the same time, between the diluant inlet 400 of the reusable fluid dispenser 100 and the diluant inlet 204A of the disposable fluid pack 200, both axes being parallel.

In use, the diluant passes through the pump 204, mixes with the fluid from the fluid reservoir 202 in the outlet of the pump 204 and exits out of the orifice 208. Consequently, the diluant is mixed with the fluid from the fluid reservoir 202 in the pump 204, during use of the device 1, and the mixed fluid does not contact the components of the reusable fluid dispenser 100, preventing cross contamination. Examples of a concentrate that may be provided in the fluid reservoir 202 are car shampoo or insecticide which is to be mixed with water prior to application. By only providing a concentrate in the fluid reservoir 202, the size of the disposable fluid pack 200 is reduced, reducing packaging and weight.

FIG. 11 illustrates schematically an exemplary dilution rotary pump which may be used in the disposable fluid pack 200 described herein. The dilution rotary pump has the same external geometry as the previously described pumps. WO2014/135563 A1 describes dilution rotary pumps in more detail. The dilution rotary pump illustrated in FIG. 11 is a four-bolus pump comprising a rotor 71 provided within a housing 70. The pump also comprises a seal 72, an inlet 74 connected to the fluid reservoir 202, an outlet 75 connected to the orifice 208 and a second inlet 76 which is the diluant inlet. As discussed above with reference to FIG. 10, a pipe for delivering the diluant is connected to the diluant inlet 400 of the reusable fluid dispenser 100, which is in turn connected to the second inlet 76 (diluant inlet 204A of FIG. 10) of the dilution pump. The dilution pump is configured to pass the diluant to the outlet 75 of the pump, via the orifice 77, where it meets the flow of fluid from the fluid reservoir 202. The ratio of diluant to concentrate (from the fluid reservoir 202) is a function of pump rotation speed as known in the art.

The device 1 is configured to function when the diluant is fed to the dilutant inlet 400 at a known pressure, such as a pressure of 1½ bar. The pressure of the diluant may be set using a regulator provided at the diluant source. In some embodiments, such as for use in a domestic setting, the device 1 is configured to be attached to a standard hose pipe at the diluant inlet 400. The hose pipe is turned on delivering water (diluant) to the diluant inlet 400 and then the device 1 is activated. When configured for use in an industrial setting, the device 1 may be configured for use with a different pressure if required and the controller may operate a solenoid valve to start/stop the flow of diluant in conjunction with the starting and stopping of the pump.

Since the diluant is delivered at a known pressure, passes through an orifice of known diameter, and the pump 204 is controlled at a known rotation speed (defined by the encoder 206), the flow rate is known, so the mix ratio of diluant and concentrate (from the reservoir 202) can be accurately controlled leading to precision dilution. This precision mixing may allow higher concentrations of fluid to be used in the reservoir to reduce weight and packaging cost.

According to one embodiment, the disposable fluid pack 200 is configured to dispense a foam. In this embodiment, a foaming orifice 208 is provided to dispense the foam and the pump may be a diluant pump. Foaming is achieved by mixing a diluant with a fluid, such as concentrate from the fluid reservoir 202 and then pumping the mixture through a foam orifice which sucks in air to aerate the fluid and create the foam.

The device 1 described herein may be a hand-held unit, although it is not limited to such an arrangement.

The device 1 described herein for dispensing fluids may be used in various different applications, which include:

Home Care—for example, spraying polishes, cleaning fluids, shower and window surfactants etc.;

Garden Care—for example, spraying insecticides, fertilizers, weedkillers, wood preservatives etc.;

Garage Care—for example, spraying penetrating oils, degreasing fluids etc.;

Institutional—for example, dispensing hospital and hotel cleaning and sanitising agents etc.;

Industrial—for example, spraying road and tree marker paints etc.;

Medical—for example, intravenous, sub-cutaneous, enteral infusion, supply of fluid to or within another medical device.

In medical care settings, it is vitally important that the fluid dispenser dispenses the correct amount of fluid. Therefore, according to another embodiment, the motor of the reusable fluid dispenser 100 comprises a stepper motor with a shaft encoder and a decoder or a direct current (DC) motor with a shaft encoder and a decoder. In contrast to the embodiments described above, the shaft encoder of the stepper motor or DC motor defines the speed of rotation. When the stepper or DC motor is activated, it begins to rotate the drive shaft. The decoder is then able to read the shaft encoder and transmits a signal to the motor controller 114 defining the speed of rotation of the motor. The disposable fluid pack 200 also comprises an encoder 204 as described above. The encoder 204 of the disposable fluid pack 200 is used as a feedback device which is read by the decoder 110 during rotation of the drive shaft 108, to measure the speed of rotation. The controller 114 counts the number of rotations detected by the decoder 110 within a known period of time and determines the actual speed of rotation. The controller 114 compares the actual speed of rotation detected by the decoder 110 with the speed of rotation defined by the shaft encoder, independently verifying that the stepper motor or DC motor 106 is rotating the pump at the correct rate, and thus the correct amount of fluid has been dispensed. This mitigates a failure mode where the pump has not engaged with the motor drive shaft to transmit power from the shaft to the pump rotor.

In a further embodiment, the motor of the reusable fluid dispenser 100 comprises a stepper motor with a shaft encoder and a decoder or a DC motor with a shaft encoder and a decoder. According to this embodiment, the encoder 204 of the disposable fluid pack 200 defines the rotation speed as described above. The stepper motor or DC motor is rotated at the speed defined by the encoder 204 of the disposable fluid pack 200, whilst the shaft encoder sends a signal to the decoder to measure the speed of rotation. The controller is configured to compare the rotation speed defined by the encoder 204 with the rotation speed determined by the shaft decoder to provide independent feedback that the rotation speed defined by the encoder 204 is being achieved. The shaft encoder and decoder on the motor drive shaft independently verifies that the motor 106 is rotating the pump at the correct rate (as defined by the encoder 204). This mitigates a decimal point failure mode where the administrator has incorrectly set an infusion rate substantially incompatible with the drug type.

In a further embodiment, the pump 204 is controlled at a defined rotation speed, and thus a defined flow rate, and the operating time is measured. The dose volume may then be calculated from the flow rate and measured time or alternatively by counting the number of pump cavities (boluses) delivered by the rotor.

Figure 12A:
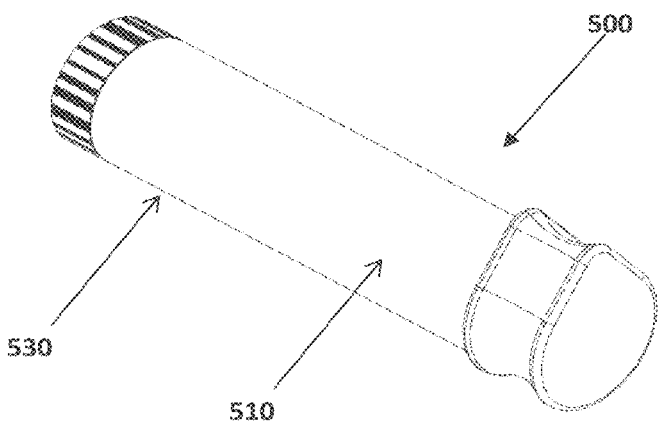
FIGS. 12A and 12B illustrate a detergent capsule.
Figure 12B:
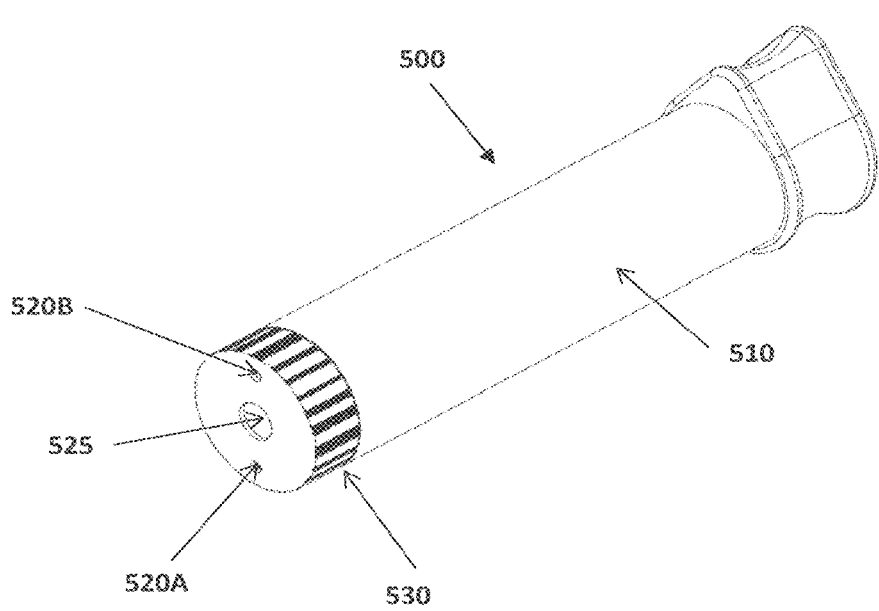
Figure 13A:
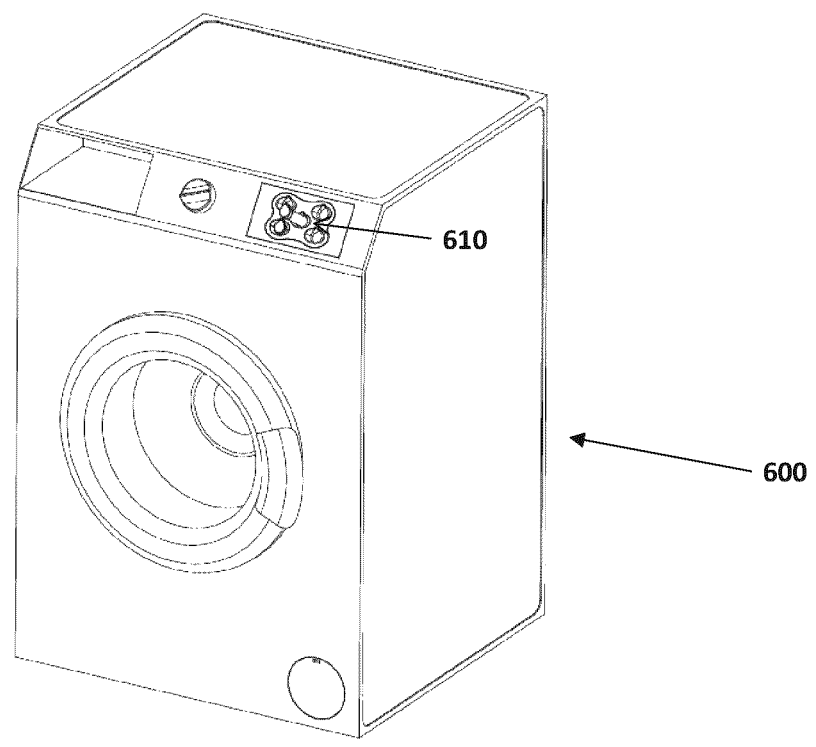
FIG. 13A illustrates a washing machine.
Figure 13B:
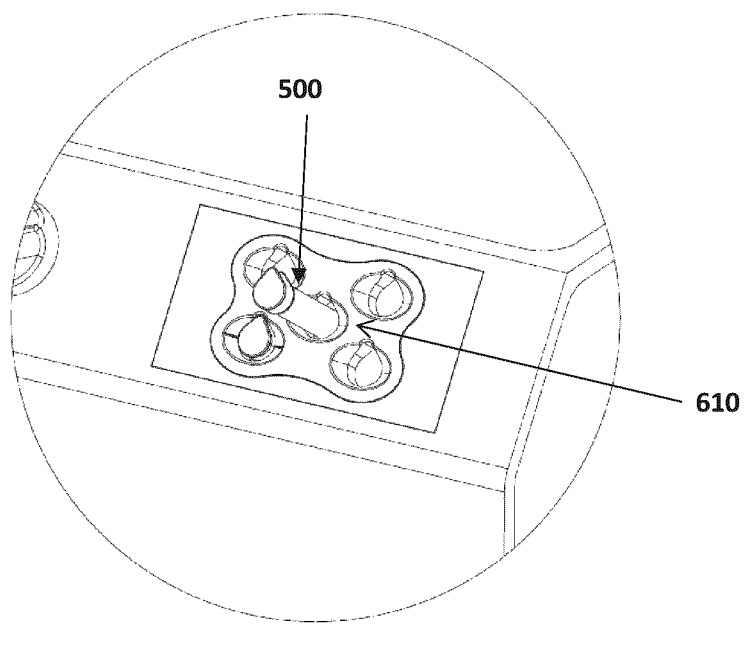
FIG. 13B illustrates a close up of part of the washing machine of FIG. 13A.

Washing machines and dishwashers are required to accurately add a dose of detergent concentrate during the fill cycle. In order to supply the correct amount of detergent during a wash cycle, a detergent capsule is provided. FIGS. 12A and 12B illustrate a plurality of detergent capsules and FIGS. 13A and 13B illustrate an exemplary washing machine. Each detergent capsule 500 is a disposable fluid pack 200 such as described herein for use with a diluant. As illustrated in FIGS. 12A and 12B, the detergent capsules 500 each comprise a fluid reservoir 510 (comprising detergent concentrate), an inlet 520A and an outlet 520B, a dilution pump and an encoder 530 arranged at one end of the capsule. Although the encoder 530 is illustrated in FIGS. 12A and 12B as a sleeve or drum encoder, a disc encoder could be used. The inlet 520A is a diluant (i.e., water) inlet to the pump and the outlet 520B is an outlet from the pump, through which the diluant and concentrate exit the capsules 500. The inlet from the reservoir 510 to the pump is not illustrated. The pump is arranged with the rotor axis parallel to the inlet and outlet 520A, 520B such that the drive shaft of a motor passes through the hole 525 in the centre of the encoder 530 to make a power transmission connection to the rotor of the pump at the same time that fluid connections are made to the washing machine inlet and outlet ports. The washing machine outlet port connects to the diluant inlet 520A to provide water to the capsule 500 and the washing machine inlet port connects to the outlet 520B of the capsule 500, through which the diluant and concentrate exit the capsule 500 into the washing machine. The detergent capsule 500 is configured to fit into a corresponding aperture 610 (illustrated in FIGS. 13A and 13B) provided in a washing machine 600 or dishwasher. When a detergent capsule 500 is provided in the aperture 610, the drive shaft of a motor provided in the washing machine 600 or dishwasher projects into the hole 525, such that the washing machine 600 or dishwasher may be considered to be a reusable fluid dispenser. According to one embodiment, each capsule contains detergent concentrate at 60:1. Such an arrangement allows the diluant to rinse the outlet of the pump presenting a clean capsule upon removal. In addition, with high concentrations of detergent in the reservoir 510, the volume of detergent concentrate per dose is very small- much smaller than the volume of any supply tube from the pump to the washing chamber. Therefore, it is important to flush through the outlet of the pump so that all the concentrate ends up in the chamber of the washing machine or dishwasher.

Alternatively, the detergent capsule 500 may comprise a pump as opposed to a diluant pump. In this embodiment, the inlet 520A is a water inlet into the capsule 500 leading to a mixing chamber and the outlet 520B is a water outlet from the capsule leading from the mixing chamber. The pump outlet is in communication with the mixing chamber.

In another alternative, the detergent capsule 500 may comprise a pump as opposed to a diluant pump and only an outlet 520B through which the detergent exits the capsules 500. However, when such a capsule is removed there is a chance of concentrated detergent coming into contact with a user's hand which is not desirable.

Washing machines and/or dishwashers are items of enduring equipment which may be considered to be a reusable fluid dispenser 100. Other items of enduring equipment may also be considered to be a reusable fluid dispenser 100, for example, equipment such as a drinks dispenser, or a cocktail or smoothie dispenser.

In order to use the device 1 described herein, a disposable fluid pack is connected to a reusable fluid dispenser, such that the drive shaft of the motor of the reusable fluid dispenser is connected to the rotor of the pump of the disposable fluid pack. Attachment means may also be used to attach the pump of the disposable fluid pack to the reusable fluid dispenser, so that the disposable fluid pack does not disconnect from the reusable fluid dispenser during use. Following connection, the button (actuator) of the reusable fluid dispenser is activated by a user which starts the motor of the reusable fluid dispenser. The drive shaft of the motor rotates the rotor of the pump and the encoder attached thereto which begins pumping the fluid from the reservoir and out of the orifice of the disposable fluid pack at a flow rate determined by the encoder. Following deactivation (of the actuator) the motor stops the pump at a stop position determined by the encoder. The disposable fluid pack may be disconnected from the reusable fluid dispenser and a different disposable fluid pack connected, either when the first disposable fluid pack is empty or when a different fluid is required.

It will be clear to one skilled in the art that many improvements and modifications can be made to the foregoing exemplary embodiments without departing from the scope of the present techniques.

The invention claimed is:

1. A disposable fluid pack for use with a reusable fluid dispenser, the disposable fluid pack comprising:
   a fluid reservoir configured to be filled with a fluid;
   a pump comprising an inlet in fluid communication with the fluid reservoir, an outlet and a rotor, the rotor configured to form a power transmission coupling with a motor drive shaft, the pump configured to pump the fluid in a first direction from the fluid reservoir and out of the outlet; and
   an encoder comprising encoded data, the encoded data defining at least one stop position of the rotor and a rotation speed of the rotor for pumping the fluid from the fluid reservoir, wherein the encoder is coupled to the rotor at a predefined position and is configured to rotate with the rotor.

2. The disposable fluid pack of claim 1, wherein the encoder data defines the rotation speed as a plurality of spaced markings.

3. The disposable fluid pack of claim 2, wherein the at least one stop position comprises two or more equally spaced stop positions, and the plurality of spaced markings are repeated between each of the two or more equally spaced stop positions.

4. The disposable fluid pack of claim 2, wherein the plurality of spaced markings defines an angular velocity and/or an acceleration profile and a deceleration profile.

5. The disposable fluid pack of claim 1, wherein the at least one stop position comprises two or more equally spaced stop positions.

6. The disposable fluid pack of claim 5, wherein each of the two or more equally spaced stop positions are aligned with a corresponding feature of the rotor.

7. The disposable fluid pack of claim 1, wherein the encoder data further defines pack information.

8. The disposable fluid pack of claim 1, wherein the encoder data further defines a direction of rotation of the rotor.

9. The disposable fluid pack of claim 1, wherein the encoder is printed onto, or etched onto, or attached to the rotor.

10. The disposable fluid pack of claim 1, wherein the pump is further configured to pump the fluid in a second direction, opposite to the first direction.

11. The disposable fluid pack of claim 1, wherein the outlet is coupled to a nozzle.

12. The disposable fluid pack of claim 1, wherein the outlet is coupled to a medical device or medical equipment.

13. The disposable fluid pack of claim 1, wherein the pump comprises a diluant pump and the disposable fluid pack further comprises a diluant inlet coupled to the diluant pump, the diluant inlet configured to receive a diluant, wherein the diluant pump is configured to mix the diluant with the fluid from the fluid reservoir and pump the mix out of the outlet.

14. A reusable fluid dispenser for use with a disposable fluid pack for dispensing fluids, the reusable fluid dispenser comprising:
   a motor comprising a drive shaft, the drive shaft configured to form a power transmission coupling with a rotor of a pump of the disposable fluid pack;
   a decoder configured to retrieve encoder data from an encoder of the disposable fluid pack, wherein the decoder is configured to detect light reflected from a plurality of spaced markings on the encoder while the encoder is rotating;
   a controller configured to receive the encoder data from the decoder and to instruct the motor to rotate the drive shaft at a rotation speed and to stop the drive shaft at any one of one or more predetermined stop positions defined by the encoder data;
   a power supply coupled to the controller, the motor and the decoder; and
   a housing, the motor, the decoder, and the controller being disposed within the housing.

15. The reusable fluid dispenser of claim 14, wherein the decoder comprises a light emitter configured to emit light at the encoder and a light sensor configured to receive light reflected from the encoder.

16. The reusable fluid dispenser of claim 15, wherein a lens array is configured to focus the light emitted from the light emitter onto the encoder and to focus the light reflected from the encoder onto the light sensor.

17. The reusable fluid dispenser of claim 15, wherein the light sensor is configured to detect the light reflected from the plurality of spaced markings provided at the encoder when the encoder is rotating, the plurality of spaced markings defining a rotation speed of the drive shaft and the one or more predetermined stop positions of the drive shaft.

18. The reusable fluid dispenser of claim 14, wherein the decoder is configured to detect the one or more predetermined stop positions and to count a number of the detected one or more predetermined stop positions per use and the controller is configured to determine an amount of fluid delivered by the reusable fluid dispenser per use based on the counted number of detected one or more predetermined stop positions.

19. The reusable fluid dispenser of claim 14, further comprising releasable attachment means for releasably attaching the pump of the disposable fluid pack to the reusable fluid dispenser and to counter torque created when the motor is activated.

20. The reusable fluid dispenser of claim 14, wherein the motor comprises a stepper motor or a direct current motor, the stepper or direct current motor comprising a shaft encoder and another decoder, the another decoder configured to measure a speed of rotation of the drive shaft during use, and wherein the controller is further configured to compare the rotation speed defined by the encoder of the disposable fluid pack with the measured rotation speed.

21. A reusable fluid dispenser for use with a disposable fluid pack for dispensing fluids, the reusable fluid dispenser comprising:

a motor comprising a drive shaft, the drive shaft configured to form a power transmission coupling with a rotor of a pump of the disposable fluid pack, wherein the motor comprises a stepper motor comprising a shaft encoder and a decoder or a direct current motor comprising a shaft encoder and a decoder, the shaft encoder defining a rotation speed of the drive shaft;

a second decoder configured to retrieve encoder data from an encoder of the disposable fluid pack, the second decoder is configured to detect light reflected from a plurality of spaced markings on the encoder while the encoder is rotating;

a controller configured to rotate the drive shaft at the rotation speed defined by the shaft encoder, to receive the encoder data from the second decoder and to compare the rotation speed with a rotation speed measured by the encoder data;

a power supply coupled to the controller, the motor and the decoder; and a housing, the motor, the decoder and the controller being disposed within the housing.

* * * * *